UNITED STATES PATENT OFFICE 3,282,630
Patented Nov. 1, 1966

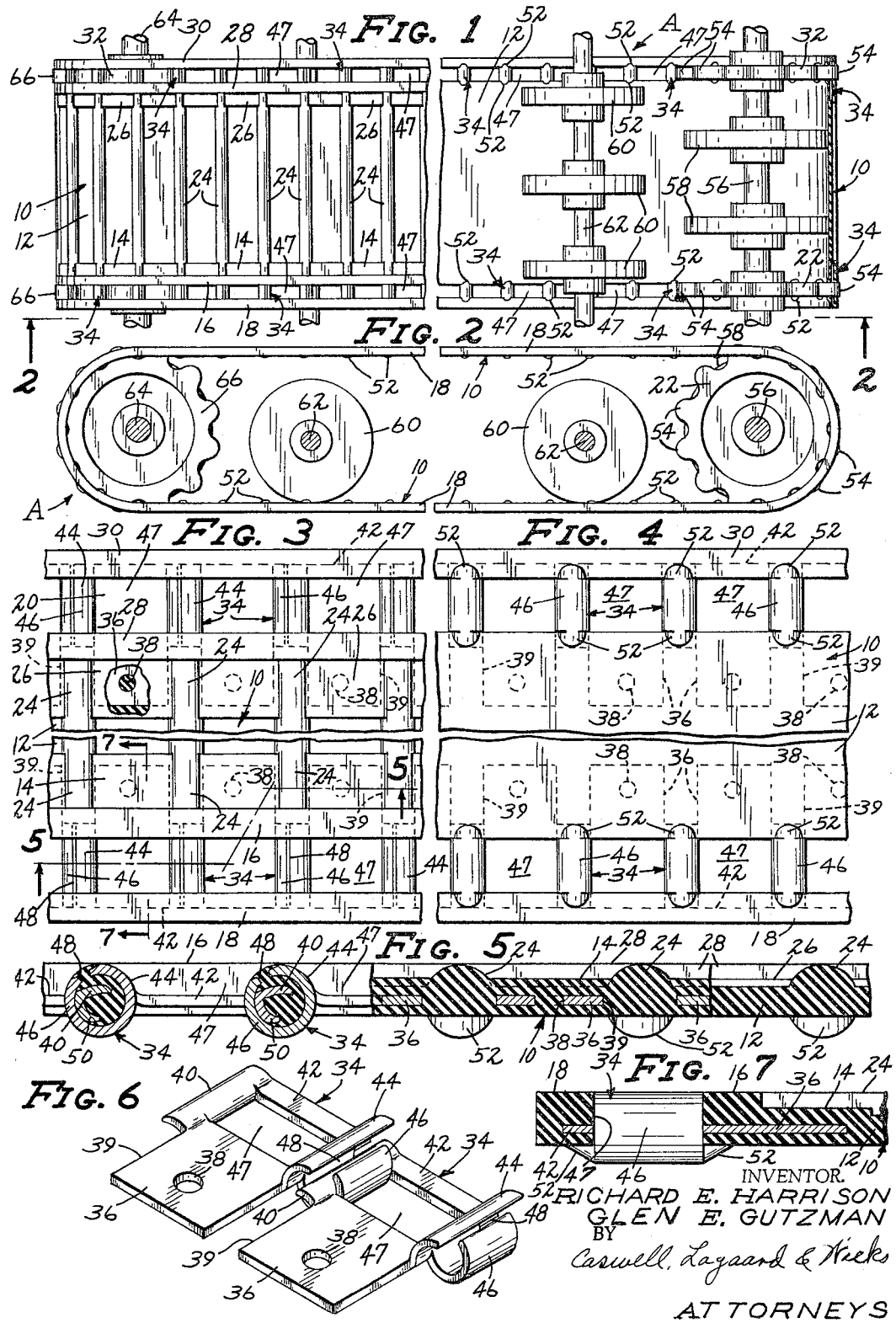

3,282,630
ENDLESS TRACK FOR POWERED VEHICLES
Richard E. Harrison, 29 3rd St. NE., and Glen E. Gutzman, 8 3rd Ave. SW., both of Crosby, Minn.
Filed Nov. 20, 1964, Ser. No. 412,684
4 Claims. (Cl. 305—38)

The invention relates to an improvement in an endless track for the propulsion of a vehicle over the ground.

It is an object of the invention to provide an endless track with which the pull load is not dependent primarily on the strength of the rubber and fabric in the track but on the metal link chain molded and vulcanized to the rubber fabric. This makes for long life on the fabric and allows a relatively light track fabric to be used.

It is a further object to provide an endless track which has no transverse rod cleat members which are highly susceptible to bending and fracturing the fabric. With a broken link member, the same can be removed from the track and a new link installed.

It is an additional object to provide an endless track having a main body portion of rubber covered fabric with metal link chain molded and vulcanized into the same whereby there are no exposed fabric edges to wear.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a top plan view of an endless track embodying the invention, portions thereof being broken away with other portions being in section.

FIGURE 2 is a sectional view on the line 2—2 of FIGURE 1.

FIGURE 3 is a top plan view of a portion of the track, a portion thereof being broken away.

FIGURE 4 is a bottom plan view of a portion of the track, a portion thereof being broken away.

FIGURE 5 is a section on the line 5—5 of FIGURE 3.

FIGURE 6 is a perspective view of the steel link chain member removed from the track.

FIGURE 7 is a sectional view on the line 7—7 of FIGURE 3.

Referring to the drawings in particular, the endless track A includes the endless flat fabric-reinforced rubber body member 10. The body member is formed with a central longitudinal portion 12 extending throughout the length of the track which is of a minimum and constant thickness. Adjacent to and outwardly of one side of the central portion 12 is the first longitudinally extending shoulder portion 14 which has a thickness greater than the central portion 12, and adjacent to and outwardly of the longitudinal shoulder portion 14 is the first longitudinally extending inner ridge portion 16 which has a thickness greater than that of the shoulder portion 14. Further provided is the first outer longitudinal portion 18 which is spaced laterally from the inner ridge 16.

Extending from the inner ridge 16 and transversely of the body member 10 is the raised cleat formation 24. Adjacent to and outwardly of the opposite side of the central portion 12 is the second longitudinally extending shoulder portion 26 identical in formation to the first shoulder portion 14, and adjacent to and outwardly of the shoulder portion 26 is the first longitudinally extending inner ridge portion 28 which is identical to the first inner ridge portion 16. Also provided is the second outer longitudinal ridge portion 30 which is spaced laterally from the second inner ridge 28.

The numeral 34 designates a section of a metal link chain which includes a flat substantially rectangular inner base portion 36 which has extending therethrough the hole 38. Extending from the edge 39 of the portion 36 at its inner end is the first arcuate lip portion 40 which terminates at its outer end in the outer link portion 42 which terminates at its opposite end in the minor arcuate lip portion 44 from which extends the complementary major arcuate lip portion 46, the length of which is less than that of lip portion 44. The edge of lip portion 46 is spaced from the edge of lip portion 44 to form the slot 48 therebetween. Also provided as complementary to the first lip 40 is the short lip portion 50. The major arcuate lip portion 46 and minor lip portion 44 forms a partial cylindrical bearing in which the first arcuate lip portion 40 and the short lip 50 rotate thereby uniting one link 34 with the other in pivotal connection.

A multiplicity of links 34 are provided and each link has the rectangular base portion 36 embedded and vulcanized within the shoulder portions 14 and 26, and the outer link portion 42 is embedded and vulcanized within the outer longitudinal portions 18 and 30, the rubber filling in the spaces between the lips 40 and 50 and the portions 44 and 46. The link 34 is further locked in place by the rubber extending through the hole 38 of the base portion 36. The inner edge of the outer longitudinal portions 18 and 30 and the outer edge of the ridges 16 and 28 together with the lips 44 and 46 form tooth openings 47 which receive the teeth of toothed gears such as 22 and 32 for supporting and/or driving the track A.

The raised cleat formation 24 extends from the first inner ridge portion 16 to the second inner ridge portion 28 transversely of the body 10. On the inner surface of the body 10, particularly FIGURE 4, is included the small ramp portions 52 which lead from the flat surface of the body 10 up to each end of the portion 46 of each of the major arcuate lip portions 46.

The openings 47 of the track A receive the teeth 54 of the toothed wheels 22 and 32 mounted on the axle 56. The body 10 is supported by the idler wheels 58 mounted on the axle 56 and supported further by the idler wheels 60 mounted on the axles 62. The track A is also supported on the axle 64 which mounts toothed wheels 66 identical to toothed wheels 22 and 32. It will be seen that the track A is driven by the teeth of the toothed wheels 22 and 32 engaging within the openings 47, the teeth bearing against the portions 44 and 46 of the link chains 34, and as a result, the load is borne by the link chains 34 and not the body 10 on which is formed the cleat portions 24.

The invention is not to be understood as restricted to the details set forth since these may be modified within the scope of the appended claims without departing from the spirit and scope of the invention.

Having thus described the invention what is claimed as new and desired to be secured by Letters Patent is:

1. In an endless track for powered vehicles having spaced chains each comprising interconnected links each formed with an outer side portion and an inner plate like base, lip portions extending across said side portion and base at one end thereof and constituting a bearing having a longitudinal slot therein, a lip portion extending across said side portion and base at the other end of said side portion and base adapted to enter the bearing of an adjacent link and serving as a journal, the combination of:

(a) an endless sheet-like flexible body member,
(b) said chains being disposed at the marginal portions of said body member, (c) outer ridge portions at the outer edges of said chains and in which the outer side portions and the outer ends of the bearings of the links are imbedded,
(d) inner ridge portions at the inner edges of said chains and in which the inner ends of the bearings and the inner portions of said plate like bases are imbedded,
(e) said inner ridge portions being integral with said body member,
(f) shoulder portions extending along said inner ridge portions and integral therewith and in which the remainders of the bases are imbedded and,
(g) cleats extending across said body member on the outer surface thereof and integral therewith,
(h) said cleats being integral with said shoulder portions.

2. An endless track in accordance with claim 1 in which:
(a) the bases of the chain links have holes extending therethrough and into which parts of the shoulder portions extend to form keys engagable with said bases to hold the links attached to said body member.

3. An endless track in accordance with claim 1 in which the outer ridge portion is removably attached to the links.

4. An endless track in accordance with claim 1 in which:
(a) the outer ridge portions are free from the inner ridge portions.

References Cited by the Examiner
UNITED STATES PATENTS

| 2,652,290 | 9/1953 | Bekker | 305—38 X |
| 2,899,242 | 8/1959 | Bombardier | 305—38 |

FOREIGN PATENTS

| 580,626 | 9/1924 | France. |
| 457,245 | 3/1928 | Germany. |

BENJAMIN HERSH, *Primary Examiner.*

SAMUEL FEINBERG, *Examiner.*

R. J. JOHNSON, *Assistant Examiner.*